United States Patent
Bozio et al.

(10) Patent No.: US 9,713,972 B2
(45) Date of Patent: Jul. 25, 2017

(54) CONSOLE FOR VEHICLE INTERIOR

(71) Applicant: Shanghai Yanfeng Jinqiao Automotive Trim Systems Co., Ltd., Plymouth, MI (US)

(72) Inventors: Ronald A. Bozio, Holland, MI (US); Jason M. Hipshier, Hudsonville, MI (US); Kenneth Daniel Sherburn, Grandville, MI (US); Chris J. Harmelink, Grandville, MI (US); Rick A. Anderson, Grand Haven, MI (US)

(*) Notice: Subject to any disclaimer, the term of this patent is extended or adjusted under 35 U.S.C. 154(b) by 0 days.

(21) Appl. No.: 15/063,225

(22) Filed: Mar. 7, 2016

(65) Prior Publication Data

US 2016/0185264 A1 Jun. 30, 2016

Related U.S. Application Data

(63) Continuation-in-part of application No. PCT/US2014/053564, filed on Aug. 29, 2014.
(Continued)

(51) Int. Cl.
*B60N 2/46* (2006.01)
*B60R 7/04* (2006.01)

(52) U.S. Cl.
CPC ......... *B60N 2/4686* (2013.01); *B60N 2/4633* (2013.01); *B60N 2/4646* (2013.01); *B60R 7/04* (2013.01)

(58) Field of Classification Search
CPC ........ B60N 2/4646; B60N 2/4686; B60R 7/04
(Continued)

(56) References Cited

U.S. PATENT DOCUMENTS 5,133,912 A 7/1992 Hagiwara et al.
5,752,740 A 5/1998 Volkmann et al.
(Continued)

FOREIGN PATENT DOCUMENTS

DE 3838145 C1 4/1990
DE 102007024000 A1 11/2008
(Continued)

OTHER PUBLICATIONS

International Preliminary Examination Report on Patentability dated Mar. 8, 2016 for PCT/US2014/053564.
(Continued)

*Primary Examiner* — Jason S Morrow (57) ABSTRACT

A console for a vehicle interior comprises a structure comprising a storage volume and an armrest comprising a tambour door and configured for adjustment from a first position to a second position. The tambour door of the armrest is configured for movement to uncover the storage volume. The vehicle interior component comprises a base and an armrest assembly. The armrest assembly is configured for movement between a raised position and a lowered position relative to the base. The cover of the armrest assembly is configured to move from a closed position to an open position while the armrest assembly is in the raised position and in the lowered position. The console assembly comprises a base and a cover assembly comprising a housing and providing a cover. The cover is configured for movement relative to the base and the housing and movement between a raised position and a lowered position.

18 Claims, 8 Drawing Sheets

Related U.S. Application Data (60) Provisional application No. 61/874,918, filed on Sep. 6, 2013.

(58) Field of Classification Search
USPC .................................. 296/24.34, 37.8, 37.15
See application file for complete search history.

(56) References Cited

U.S. PATENT DOCUMENTS

| | | | | |
|---|---|---|---|---|
| 8,579,348 B1 * | 11/2013 | Myers | ...................... | B60R 7/04 296/24.34 |
| 2009/0072568 A1 * | 3/2009 | Luginbill | .................. | B60R 7/04 296/37.8 |
| 2013/0269886 A1 * | 10/2013 | Sato | ......................... | B60R 7/04 160/327 |

FOREIGN PATENT DOCUMENTS

| | | | | |
|---|---|---|---|---|
| FR | 2961763 | A1 | | 12/2011 |
| JP | H09169243 | A | * | 6/1997 |
| JP | 2000103289 | A | * | 4/2000 |

OTHER PUBLICATIONS

International Search Report dated Dec. 9, 2014 for PCT/US2014/053564.

* cited by examiner

CONSOLE FOR VEHICLE INTERIOR

CROSS REFERENCE TO RELATED APPLICATION

The present application is a continuation-in-part of PCT Application No. PCT/US2014/53564 titled "ADJUSTABLE VEHICLE ARMREST ASSEMBLY HAVING A TAMBOUR DOOR" filed Aug. 29, 2014. The present application claims priority from and the benefit of and incorporates by reference in entirety the following applications: (a) U.S. Provisional Patent Application Ser. No. 61/874,918 titled "ADJUSTABLE VEHICLE ARMREST ASSEMBLY HAVING A TAMBOUR DOOR" filed Sep. 6, 2013; and (b) PCT Application No. PCT/US2014/53564 titled "ADJUSTABLE VEHICLE ARMREST ASSEMBLY HAVING A TAMBOUR DOOR" filed Aug. 29, 2014.

FIELD

The present invention relates to console for a vehicle interior. The present invention also relates to a console with an armrest assembly. The present invention further relates to an armrest assembly with storage compartment.

BACKGROUND

It is known to provide a console for a vehicle interior. It is also known to provide a console with an armrest to facilitate occupant comfort in a vehicle. The armrest may be coupled to a seat, a door panel and/or a floor console in the vehicle. It is known to provide an armrest that is adjustable in positions and/or orientation, for example to accommodate vehicle occupants of different heights and/or builds or to accommodate occupants in various seating positions. It is also known to provide a storage compartment in a vehicle interior, for example, in an overhead console, a center console, an armrest, seat, door panel, or other areas of the vehicle interior. A storage compartment may include a door.

It would be advantageous to provide an improvement for a console for a vehicle interior. It would also be advantageous to provide in the console an armrest assembly having a tambour door. It would further be advantageous for the armrest assembly to provide an armrest with a storage compartment beneath the armrest having a door to control access to the storage compartment.

SUMMARY

The present invention relates to a console for a vehicle interior. The console comprises a support structure comprising a storage volume and an armrest comprising a tambour door and configured for adjustment from a first position to a second position. The tambour door of the armrest is configured for movement from a closed position to cover the storage volume to an open position to uncover the storage volume.

The present invention also relates to a vehicle interior component. The vehicle interior component comprises a base and an armrest assembly providing a cover. The armrest assembly is configured for movement between a raised position and a lowered position relative to the base. The cover of the armrest assembly is configured to move from a closed position to an open position while the armrest assembly is in the raised position and in the lowered position.

The present invention further relates to a console assembly for a vehicle interior. The console assembly comprises a base and a cover assembly for the base comprising a housing and providing a cover. The cover is configured for movement relative to the base and relative to the housing. The cover assembly is configured for movement between a raised position and a lowered position. The cover is configured for movement relative to the base and relative to the housing in both the raised position and the lowered position.

DESCRIPTION

Figure 1A:
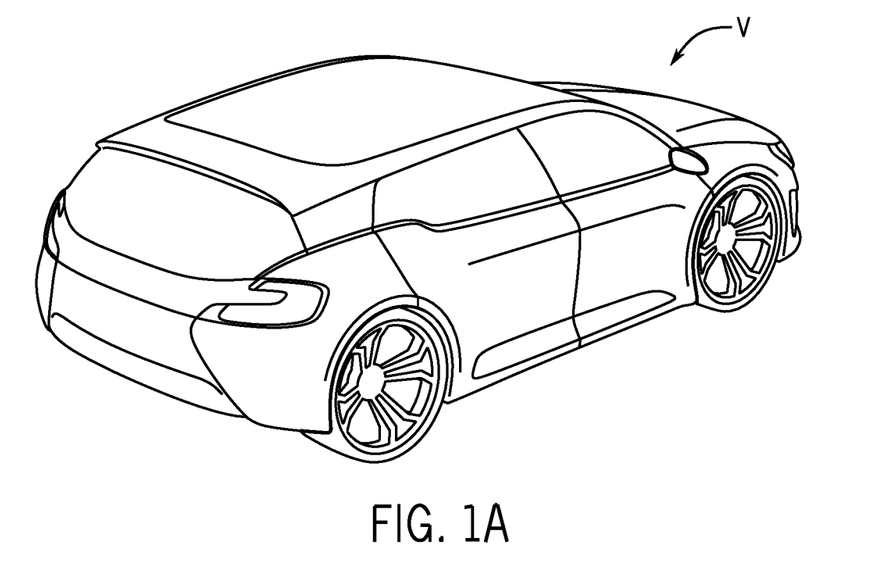
FIG. 1A is a schematic perspective view of a vehicle according to an exemplary embodiment.
Figure 1B:
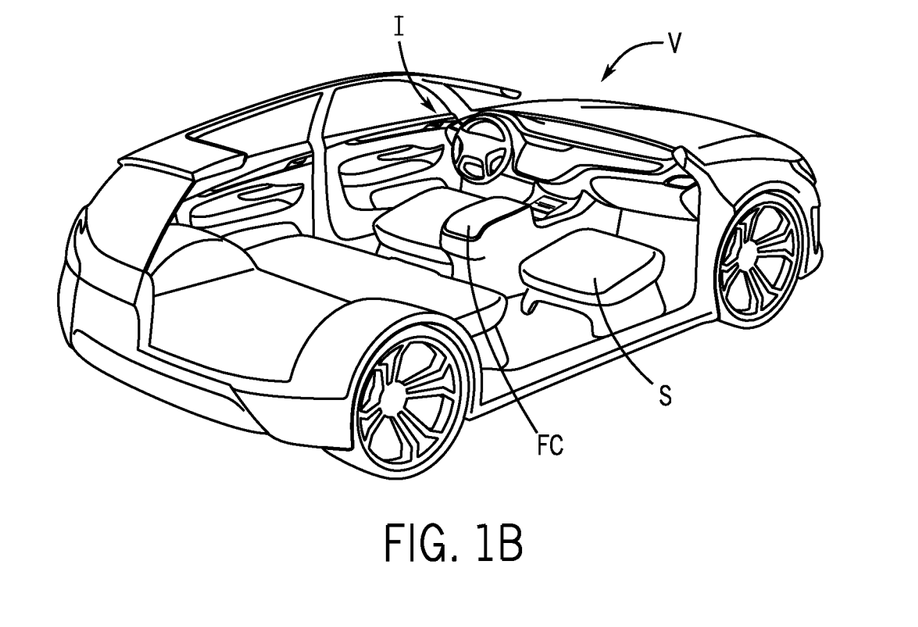
FIG. 1B is a schematic perspective cut-away view of the vehicle showing the interior of the vehicle according to an exemplary embodiment.

FIG. 1 is a perspective view according to an exemplary embodiment of a vehicle that may include an adjustable armrest assembly with a tambour door. According to an exemplary embodiment, the vehicle V includes an interior I having a seat S and a floor console FC. According to an exemplary embodiment, the floor console FC comprises an armrest assembly having a vertically and horizontally adjustable armrest and a tambour door disposed on the armrest and configured to facilitate access to a storage compartment within the floor console FC.

According to an exemplary embodiment, the armrest assembly includes a support structure shown as the floor console FC and a structure with a shroud attached to the structure pivotally coupled to the support structure; the armrest assembly also includes an armrest slidingly supported by the structure. See e.g. FIGS. 3 and 5. The armrest is configured to slide between a retracted position and an extended position relative to the structure (see FIGS. 2, 3, 6D, 7A, 7B, 8A, 8B, 9C and 9D) and the structure facilitates rotation of the armrest between a raised position and a lowered position relative to the support structure (see FIGS. 2, 3, 6A, 6B, 6C, 8A, 9C and 9E). According to an exemplary embodiment as indicated in FIGS. 3, 9C-9F, 7A, 7B, 8A and 8B, the position of the armrest is vertically and horizontally adjustable. According to an exemplary embodiment, the vehicle armrest assembly includes a tambour door slidingly disposed on the armrest. See e.g. FIGS. 2, 4, 7A-7D and 8A-8D. The tambour door is configured to slide between an opened position and a closed position relative to the armrest while the armrest is in or between the retracted position and the extended position and while the armrest is in or between the raised position and the lowered position. See e.g. FIGS. 7A-8F. According to an exemplary embodiment (as shown in FIGS. 7A-8F), the tambour door selectively facilitates access and blocks access to a storage compartment within the support structure regardless of armrest position.

According to an exemplary embodiment, the armrest assembly includes a track system (or assembly) configured to support the tambour door and to enable the tambour door to slide between the opened position and the closed position. See FIGS. 6A-6D and 9A-9F. The track assembly may include multiple tracks. According to an exemplary embodiment, the support structure includes a first track; the armrest/cover assembly (structure) includes a second track; and the armrest includes a third track. The first track, second track, and third track are in alignment; the tambour door is configured to slide between the opened position and the closed position while the armrest is in or between the retracted position and the extended position and while the armrest is in or between the raised position and the lowered position. See e.g. FIGS. 6A-6D and 9C-9F. According to an exemplary embodiment, the second track and third track interface with one another to establish a substantially continuous path between an end of the second track and an end of the third track while the armrest is in or between the retracted position and the extended position. The first track and the second track are separated by a gap G while the armrest is in the lowered position to facilitate rotation of the structure relative to the support structure; the tracks are configured to maintain alignment with one another as the armrest slides and/or rotates; the track assembly facilitates movement of the tambour door between the opened and closed positions regardless of the position (vertical and/or horizontal) of the armrest. See FIGS. 6A-6D and 9C-9F.

Figure 2:
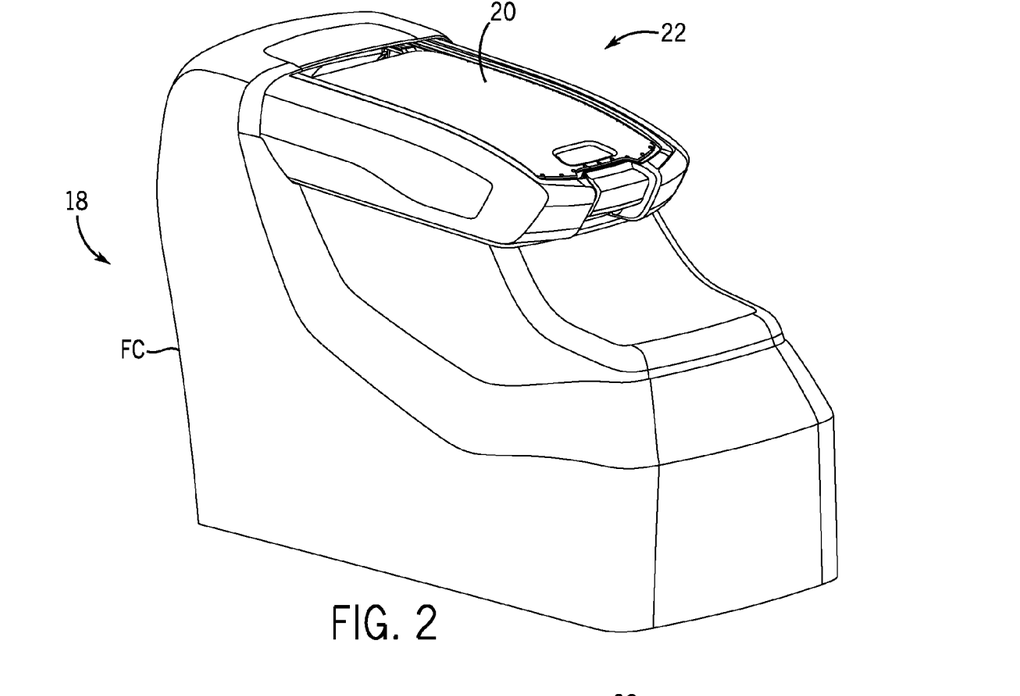
FIG. 2 is a schematic perspective view of an adjustable armrest assembly having a tambour door according to an exemplary embodiment.

FIG. 2 is a perspective view of an embodiment of an adjustable armrest assembly 18 having a tambour door 20 according to an exemplary embodiment. The floor console FC forms a support structure for the adjustable armrest assembly 18; the floor console FC may include a storage compartment configured to retain various items, such as documents, personal items, articles, eye glasses, and/or portable electronic devices (among other items). According to an exemplary embodiment, the armrest assembly 18 includes an armrest 22 configured to rotate in an upward direction between the lowered position and a raised position. The armrest assembly 18 also may provide a shroud positioned below the armrest 22 and configured to rotate with the armrest 22; the shroud is disposed within the floor console FC. According to an exemplary embodiment, with the armrest 22 in the lowered position, the floor console FC substantially contains the shroud; when the armrest 22 is rotated in the upward direction, a portion of the shroud is exposed (and shrouds the interior of the console). See FIGS. 3, 6B and 8A-8F. The shroud and the armrest 22 are configured to substantially cover an opening in the storage compartment while the armrest is in or between the lowered position and the raised position; items within the storage compartment are retained regardless of armrest position. According to an exemplary embodiment, an adjustment mechanism may be employed to control movement of the armrest 22 relative to the floor console FC, and to hold the armrest 22 in one of a variety of vertical positions.

According to an exemplary embodiment, the armrest 22 is also configured to slide in a forward direction from the retracted position to an extended position; the armrest 22 is slidingly supported by the structure such that the armrest may transition between the retracted and extended positions regardless of the vertical position of the armrest. See FIGS. 6A-6D and 9C-9F. According to an exemplary embodiment, the armrest 22 is slidable between the retracted position and the extended position while the armrest 22 is in or between the lowered position and the raised position; the armrest 22 is rotatable between the lowered position and the raised position while the armrest is in or between the retracted position and the extended position. See FIGS. 7A, 7B, 8A and 8B. According to an exemplary embodiment, the vertical and/or horizontal position of the armrest may be adjusted to facilitate occupant comfort.

According to an exemplary embodiment, the tambour door 20 on the armrest 22 is configured to slide in between a closed position and an opened position; the tambour door in the closed position substantially blocks the opening to the storage compartment, and the tambour door in the open position facilitates access to the storage compartment. See FIGS. 7A-8F. According to an exemplary embodiment, a vehicle occupant may slide the tambour door 20 to open and access items within the storage compartment and then slide the tambour door 20 in the other direction to close the storage compartment. According to an exemplary embodiment, the tambour door 20 is configured to slide between the opened and closed positions while the armrest is in or between the retracted position and the extended position and while the armrest is in or between the raised position and the lowered position. See FIGS. 7A-8F. According to an exemplary embodiment, an occupant may access an interior of the storage compartment regardless of the vertical and/or horizontal position of the armrest. According to an exemplary embodiment, a top surface of the tambour door 20 may provide a pod or cushion (intended to enhance occupant comfort when the occupant rests an arm on the tambour door).

Figure 3:
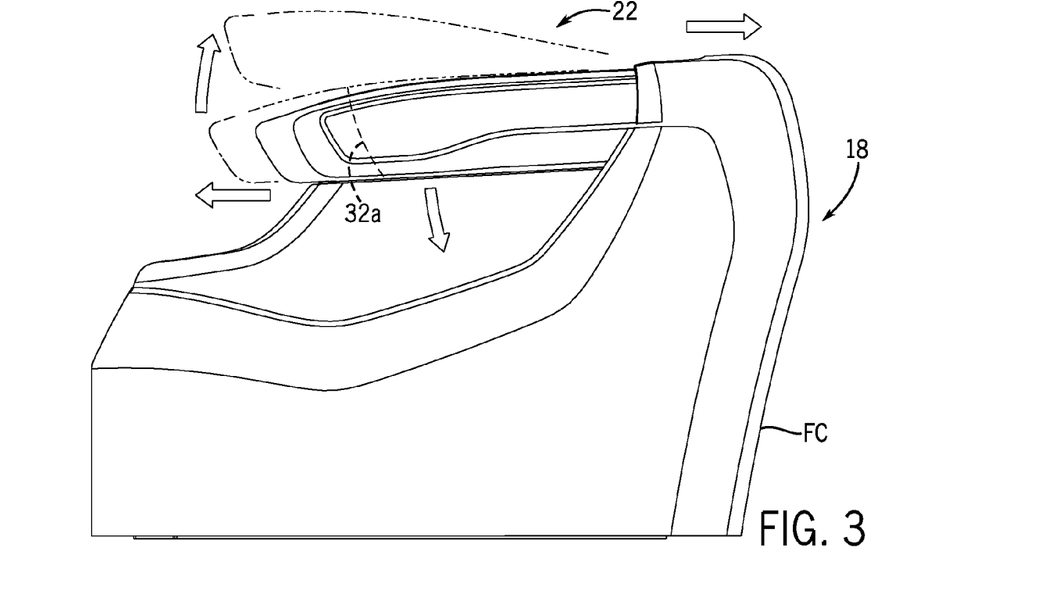
FIG. 3 is a side view of an adjustable armrest assembly according to an exemplary embodiment.

FIG. 3 is a side view of the adjustable armrest assembly according to an exemplary embodiment. With the armrest 22 in the raised position, the shroud 32a is exposed; contact between the shroud 32a and the floor console FC blocks items from being released from the storage compartment while the armrest is in the raised position (e.g., items within the storage compartment are retained regardless of armrest position). From the raised position, the armrest 22 may be rotated in a downward direction toward the lowered position. The armrest 22 is configured to slide relative to the shroud 32a; the shroud maintains the enclosed space of the storage compartment regardless of the horizontal position of the armrest 22. From the extended position, the armrest 22 may be translated in the (rearward) direction toward the retracted position. See FIGS. 7A, 7B, 8A and 8B.

Figure 4:
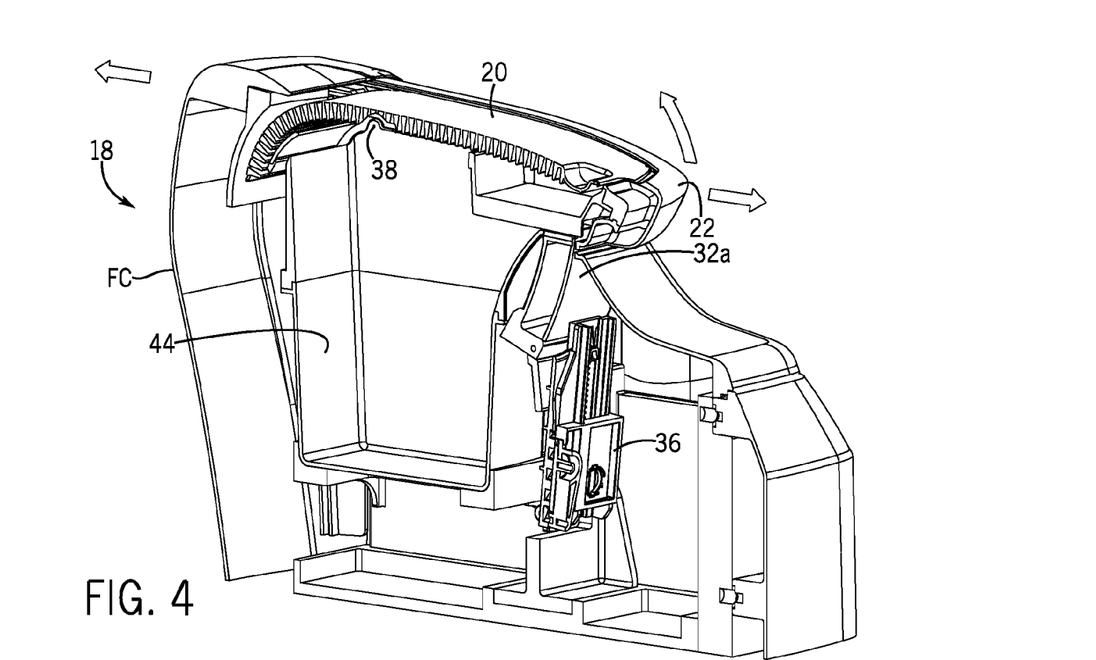
FIG. 4 is a schematic cross-section perspective view of an adjustable armrest assembly according to an exemplary embodiment.

FIG. 4 is a cross-sectional perspective view of the armrest assembly (of FIG. 2). According to an exemplary embodiment, the armrest assembly 18 includes an adjustment mechanism 36 configured to hold the armrest 22 in one of a variety of vertical positions including the lowered position and the raised position. Height of the armrest 22 may be adjusted in a vertical direction to facilitate passenger comfort (e.g., to accommodate passengers of different heights and/or builds). According to an exemplary embodiment, the structure 32 is pivotally coupled to the floor console FC by a pivot joint 38 to facilitate rotation of the armrest 22 and the structure 32 relative to the floor console FC. The pivot joint 38 is positioned at a first (e.g., rear) end of the armrest assembly 18 along a longitudinal direction. According to an exemplary embodiment, the adjustment mechanism 36 is positioned at a second (e.g., front) end of the armrest assembly 18, opposite the first end, along the longitudinal direction 41. According to an exemplary embodiment, the adjustment mechanism 36 is positioned at the opposite longitudinal end of the armrest assembly 18 from the pivot joint 38; the adjustment mechanism 36 may be subjected to less loading (e.g., torque) than an adjustment mechanism integrated within or coupled to the pivot joint. According to an exemplary embodiment, the adjustment mechanism may be constructed from lighter and/or less expensive materials (e.g., plastic or other similar material to reduce vehicle weight and/or manufacturing costs).

According to an exemplary embodiment the shroud 32a is within the floor console FC; contact between the shroud 32a and the floor console FC blocks items from being released from the storage compartment 44; items within the storage compartment 44 are retained regardless of armrest position. According to an exemplary embodiment, the adjustment mechanism 36 is positioned within a cavity between an exterior surface of the floor console FC and an interior surface of the storage compartment 44; the adjustment mechanism 36 is hidden from the vehicle occupants.

Figure 5:
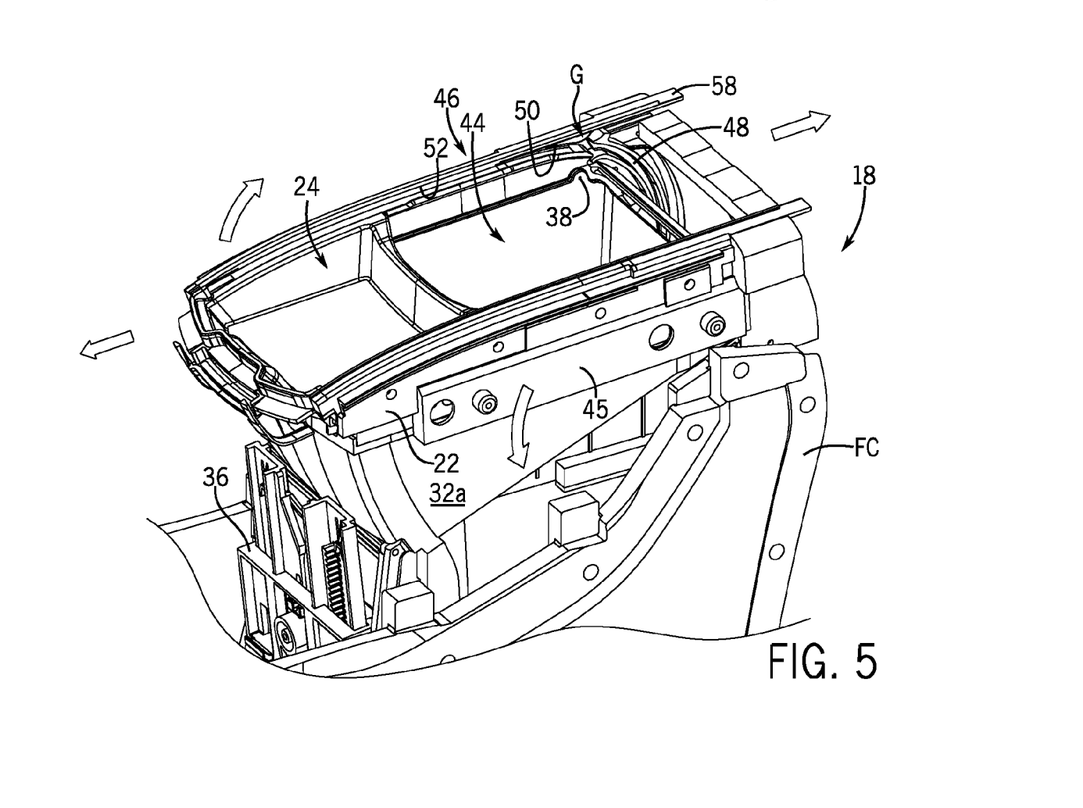
FIG. 5 is a schematic perspective view of an adjustable armrest assembly having a track assembly configured to slidingly support a tambour door according to an exemplary embodiment.

FIG. 5 is a perspective view of an embodiment of an adjustable armrest assembly 18 having a track assembly/system configured to slidingly support a tambour door. According to an exemplary embodiment, the armrest assembly 18 includes a rail assembly 45 coupled to the structure 32 and to the armrest 22. The rail assembly 45 is configured to enable the armrest 22 to slide relative to the structure 32 to facilitate movement of the armrest 22 in the longitudinal direction; the pivot joint 38 (which pivotally couples the structure 32 to the floor console FC) is configured to enable the armrest 22 to rotate relative to the floor console FC to facilitate movement of the armrest 22 in the vertical direction; the position of the armrest 22 may be adjusted to facilitate passenger comfort (e.g., to accommodate passengers of different heights and/or builds).

According to an exemplary embodiment, the armrest assembly 18 includes a track assembly 46 configured to slidingly support the tambour door (e.g., via protrusions that extend laterally outward from the tambour door). See FIGS. 5, 6A-6D and 9A-9F. The track assembly 46 includes a first track 48, a second track 50, and a third track 52; the first track 48 is part of the floor console FC (e.g., formed as a component on/attached to the floor console, coupled to the floor console, etc.); the second track 50 is part of the structure 32 (e.g., formed as a component of the structure, coupled to the shroud, etc.); the third track 52 is part of the armrest 22 (e.g., formed as a component of the armrest, coupled to the armrest, etc.). See FIGS. 5, 6A-6D and 9A-9F. The first track, second track, and third track are aligned with one another to enable the tambour door to slide between the opened position and the closed position while the armrest is in or between the retracted position and the extended position and while the armrest is in or between the raised position and the lowered position. See FIGS. 6A-6D and 9C-9F.

According to an exemplary embodiment, the second track 50 and the third track 52 interface with one another to establish a substantially continuous path between a first end of the second track 50 and a second end of the third track 52 while the armrest 22 is in or between the retracted position and the extended position. For example, as the armrest 22 is translated in the direction from the retracted position toward the extended position, the third track 52, which is part of the armrest 22, moves in the direction away from the second track 50, which is part of the structure 32; the third track 52 includes an extension 58 that maintains continuity of the path as the third track 52 moves in the forward direction. See FIGS. 6C, 6D and 9C-9F. A length of the extension 58 may be particularly selected to accommodate the horizontal range of movement of the armrest 22. See FIGS. 6D and 9C-9F.

According to an exemplary embodiment, the first track 48 and the second track 50 are separated from one another by a gap G while the armrest 22 is in the lowered position to facilitate rotation of the structure 32 relative to the floor console FC. For example, with the armrest 22 in the lowered position, the tambour door extends across the gap G between the first track 48 and the second track 50. As the armrest 22 rotates in the upward direction, width of the gap G decreases but the second track 50 remains aligned with the first track 48 to facilitate movement of the tambour door along the tracks regardless of the vertical position of the armrest. The width of the gap G may be particularly selected to accommodate the vertical range of movement of the armrest 22. See FIGS. 5, 6A-6D and 9C-9F.

Exemplary Embodiments

Figure 6A:
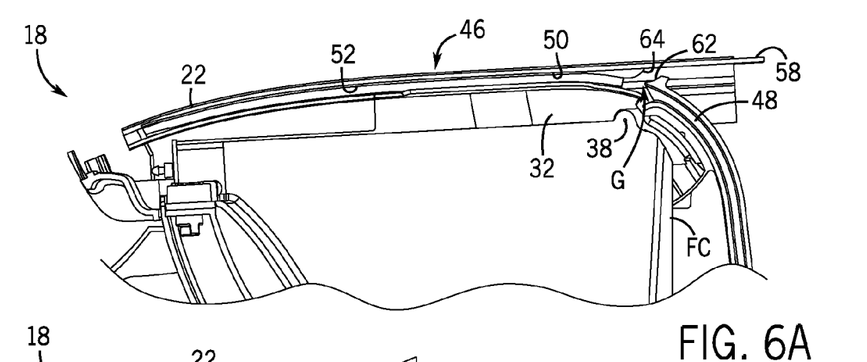
FIG. 6A is a schematic cross-section view of an adjustable armrest assembly with the armrest in a lowered and retracted position according to an exemplary embodiment.

FIG. 6A is a cross-sectional view of the adjustable armrest assembly 18 of FIG. 5. According to an exemplary embodiment, the armrest 22 is in the lowered position and the retracted position; the armrest assembly 18 includes a track assembly 46 that extends along the floor console FC, the cover/armrest assembly structure 32 and the armrest 22. According to an exemplary embodiment with the armrest 22 in the lowered and retracted position, the first track 48, the second track 50, and the third track 52 are aligned with one another; the track assembly 46 facilitates sliding movement of the tambour door between the opened position and the closed position relative to the armrest 22 (e.g. across the interface between track sections).

Figure 6B:
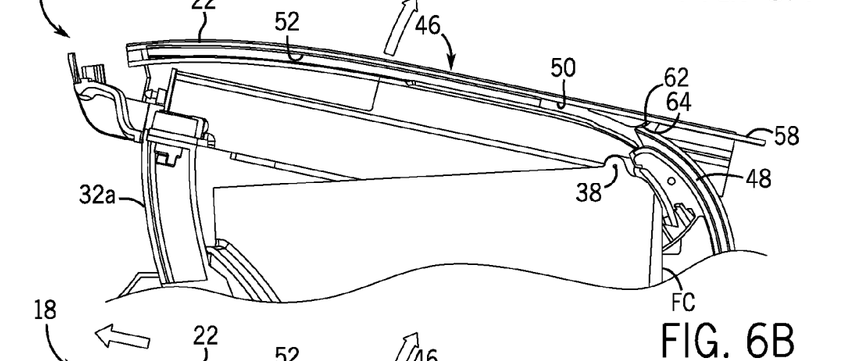
FIG. 6B is a schematic cross-section view of an adjustable armrest assembly with the armrest in a raised and retracted position according to an exemplary embodiment.

FIG. 6B is a schematic cross-sectional view of the adjustable armrest assembly with the armrest in a raised position according to an exemplary embodiment. As shown schematically in FIG. 6B, the shroud 32a is attached to the armrest assembly according to an exemplary embodiment. The shroud can be permanently fixed to the structure 32 according to an exemplary embodiment. The shroud 32a can be attached to the structure 32 by a latch mechanism according to an exemplary embodiment. When the latch is engaged, the shroud 32a moves together with the structure 32. The shroud 32a blocks access to the storage compartment 44. Items within the storage compartment 44 are retained regardless of armrest position. As shown schematically in FIG. 6C, when the latch is disengaged, the armrest can move to the raised position without the shroud. A second opening is created to allow access of the storage compartment 44 when the armrest is at the raised position.

Figures 6C, 6D:
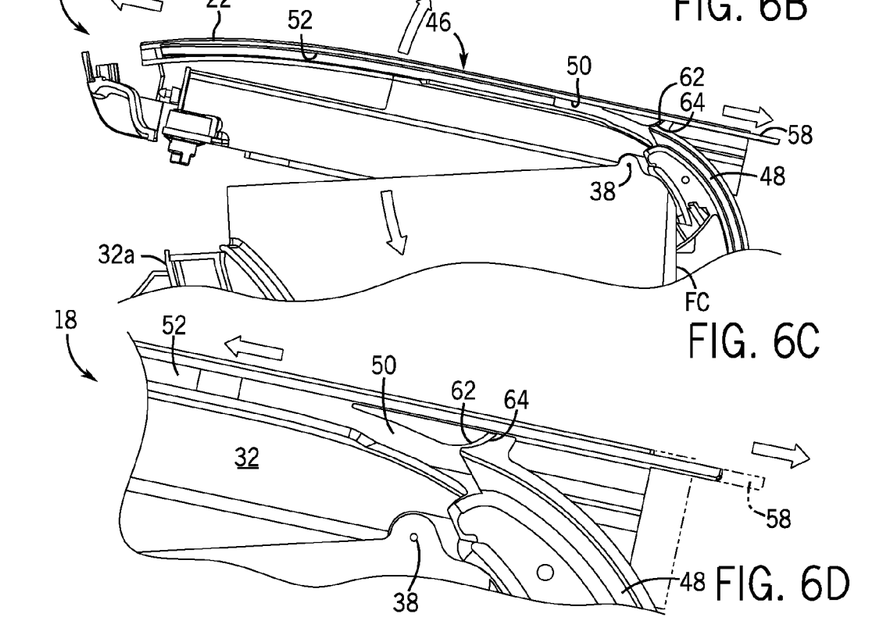
FIG. 6C is a schematic cross-section view of an adjustable armrest assembly with the shroud detached from the armrest according to an exemplary embodiment.
FIG. 6D is a schematic partial cross-section view of the armrest assembly with the armrest in a raised and extended position.
Figure 7A:
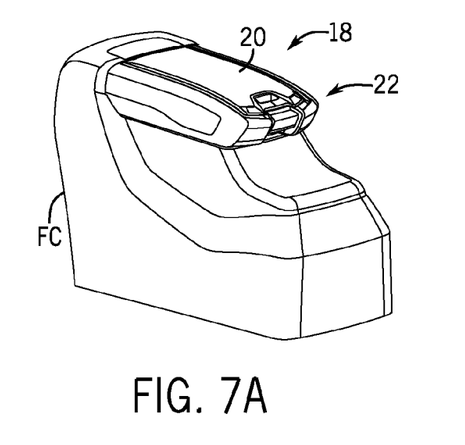
FIGS. 7A to 7F are schematic perspective views of the armrest assembly at the lowered position with the armrest in or between the retracted position and the extend position, and the tambour door in or between the closed position and the open position according to an exemplary embodiment.
Figure 7B:
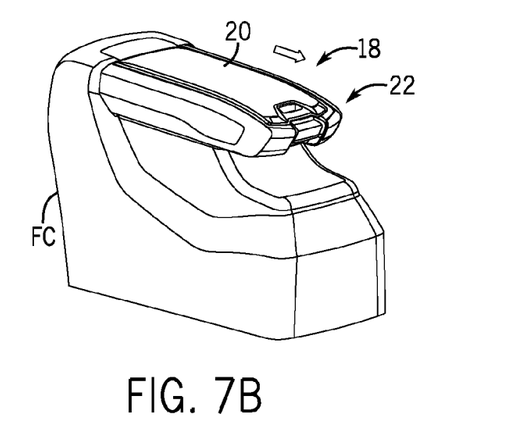
Figure 7C:
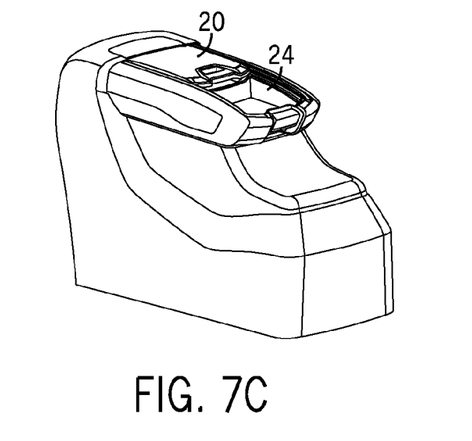
Figure 7D:
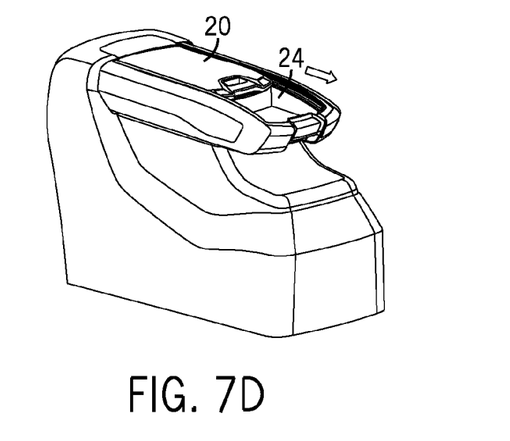
Figure 7E:
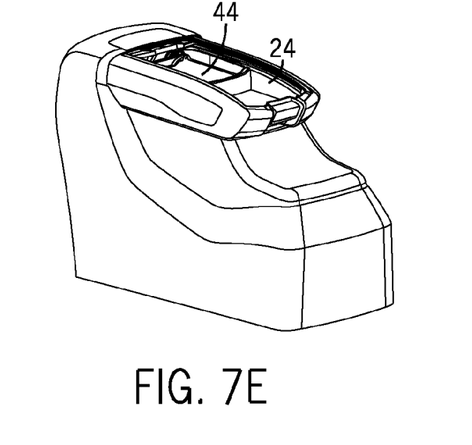
Figure 7F:
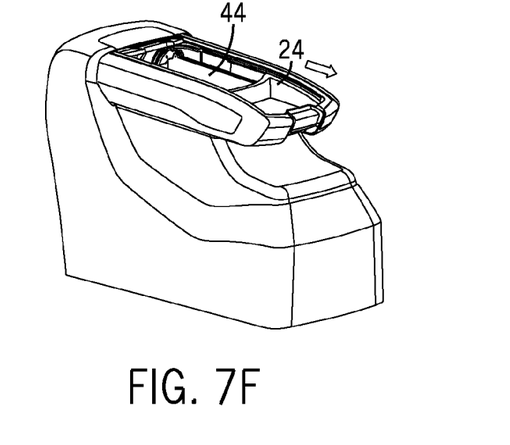
Figure 8A:
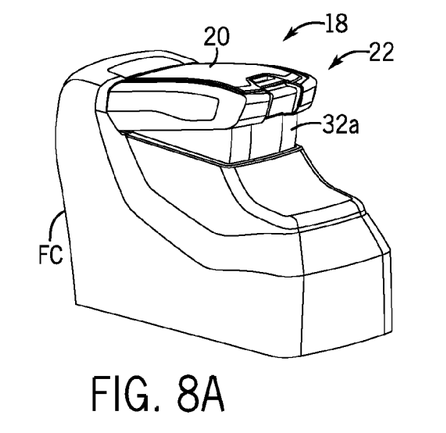
FIGS. 8A to 8F are schematic perspective views of the armrest assembly in or between the lowered position and the raised position and while the armrest is in or between the retracted position and the extend position, and the tambour door is in or between the closed position and the open position according to an exemplary embodiment.
Figure 8B:
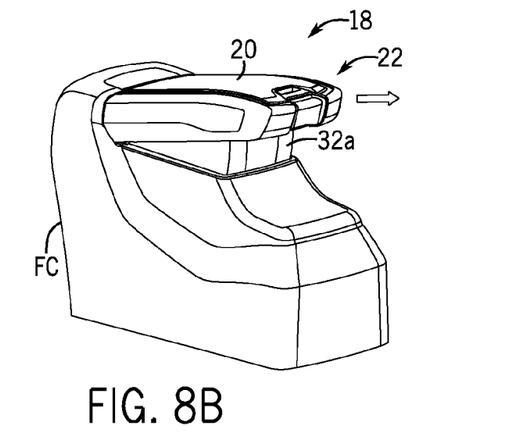
Figure 8C:
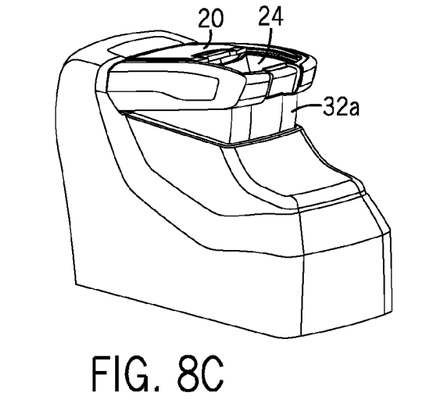
Figure 8D:
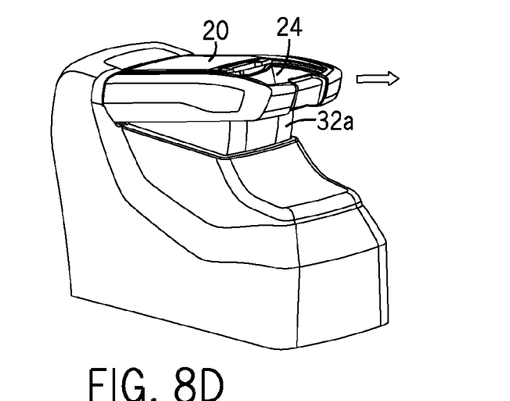
Figure 8E:
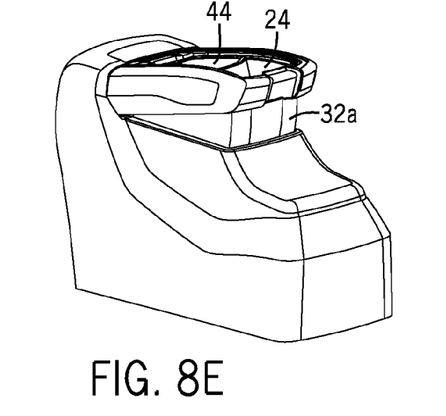
Figure 8F:
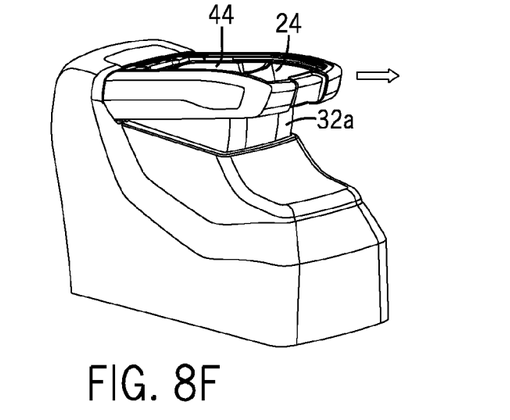

FIG. 6C is a cross-sectional view of the adjustable armrest assembly 18 with the armrest in a raised position. According to an exemplary embodiment, the second track 50 and the third track 52 form a rotatable portion of the track assembly 46 which is configured to rotate relative to a fixed portion of the track assembly (e.g., the first track 48); the rotatable portion is separated from the fixed position by the gap G, which facilitates rotation of the structure 32 relative to the floor console FC. With the armrest 22 in the raised position, the first track 48 is aligned with the second track 50 to facilitate sliding movement of the tambour door. According to an exemplary embodiment, the first track 48 includes a first contact surface 62, and the second track 50 includes a second contact surface 64. The contact surfaces 62 and 64 are configured to block rotation of the armrest 22 beyond the raised position.

FIG. 6D is a cross-sectional view of the adjustable armrest assembly with the armrest in a raised and extended position according to an exemplary embodiment. According to an exemplary embodiment the second track 50 and the third track 52 form an expandable portion of the track assembly 46. The expandable portion is configured to enable the armrest 22 to slide relative to the structure 32 and to establish a substantially continuous path along the expandable portion while the armrest is in or between the retracted position and the extended position. With the armrest 22 in the extended position the second track 50 is aligned with the third track 52, to facilitate sliding movement of the tambour door (e.g. opening and closing).

FIGS. 7A to 7F are schematic perspective views of the armrest assembly at the lowered position with the armrest in or between the retracted position and the extended position and the tambour door in or between the closed position and the open position according to an exemplary embodiment.

FIGS. 8A to 8F are schematic perspective views of the armrest assembly in or between the lowered position and the raised position and while the armrest is in or between the retracted position and the extend position and the tambour door is in or between the closed position and the open position according to an exemplary embodiment.

According to an exemplary embodiment, the tambour door 20 is disposed on the armrest 22 and configured to move between the closed position and an opened position; the closed position substantially blocks the opening to the storage compartment 44, and the open position facilitates access to the storage compartment 44. According to an exemplary embodiment (as shown in FIGS. 7C through 7F and FIGS. 8C through 8F) a second storage compartment 24 is disposed within the armrest 22. A third position of the armrest is between the closed position and the opened position. As shown in FIGS. 7C, 7D, 8C and 8D, the third position facilitates access to the storage compartment 24 and substantially blocks the opening to the storage 44. According to an exemplary embodiment, a vehicle occupant may access items within the storage compartment 24 without exposing the storage compartment 44. According to an exemplary embodiment, the tambour door 20 is configured to slide between the opened and closed positions while the armrest is in or between the retracted position and the extended position and while the armrest is in or between the raised position and the lowered position. According to an exemplary embodiment, an occupant may access an interior of the storage compartments regardless of the vertical and/or horizontal position of the armrest. See FIGS. 7A-8F.

Figure 9A:
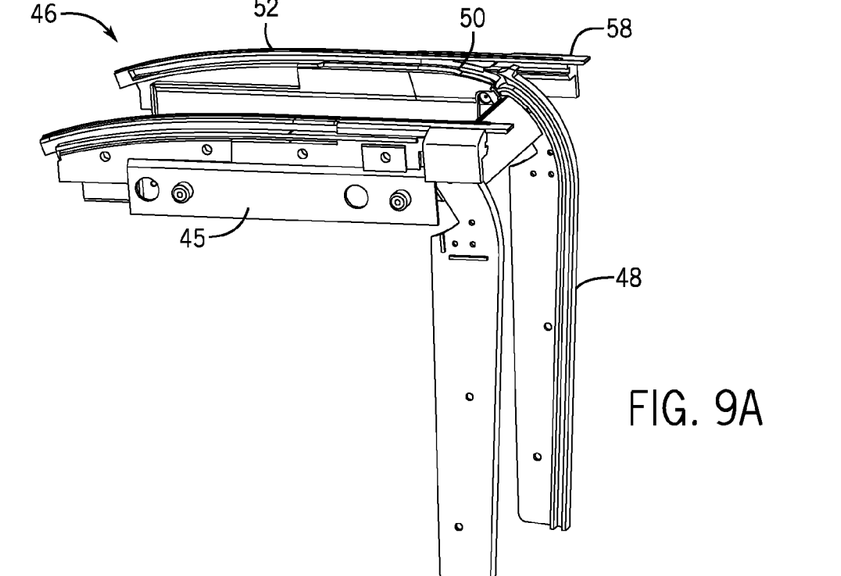
FIG. 9A is a schematic perspective view of the track assembly according to an exemplary embodiment.

FIG. 9A is a schematic perspective view of the track assembly according to an exemplary embodiment. As shown in FIG. 9A the track assembly 46 comprises a first track 48, a second track 50 and a third track 52. (The third track 52 comprises an extension 58.) The rail assembly 45 facilitates movement between second track 50 and the third track 52. See FIGS. 5 and 9A-9F.

Figure 9B:
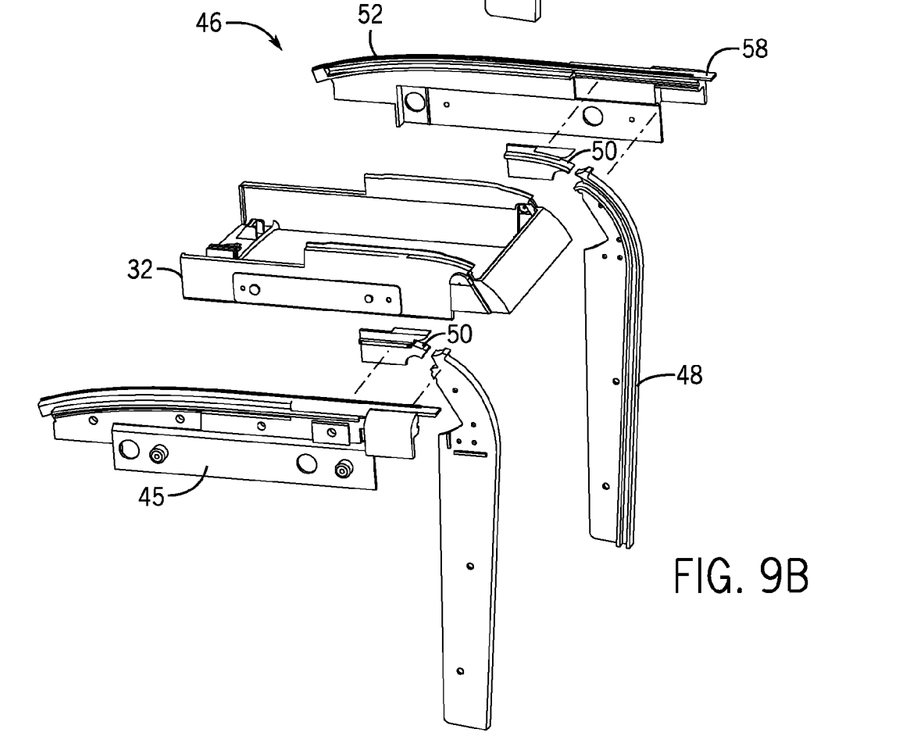
FIG. 9B is a schematic exploded perspective view of the track assembly according to an exemplary embodiment.

FIG. 9B is a schematic exploded perspective view of the track assembly according to an exemplary embodiment. As shown in FIG. 9B, the track assembly 46 further comprises structure 32. The second track 50, the third track 52 and rail assembly are mounted with the structure 32. The structure 32 facilitates movement of the second track 50 and the third track 52 within the raised position and the lowered position.

Figure 9C:
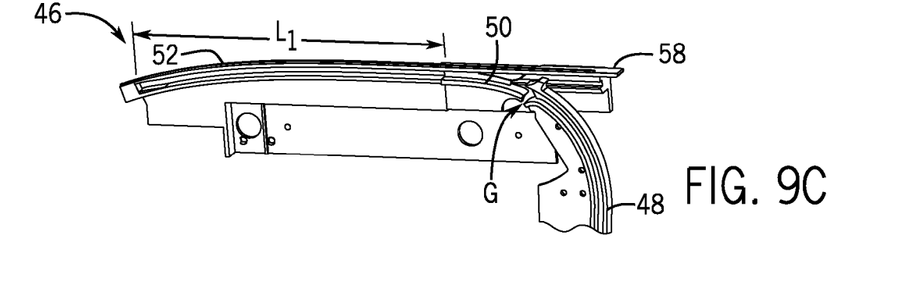
FIG. 9C is a schematic partial side view of the track assembly in the retracted and lowered position according to an exemplary embodiment.
Figure 9D:
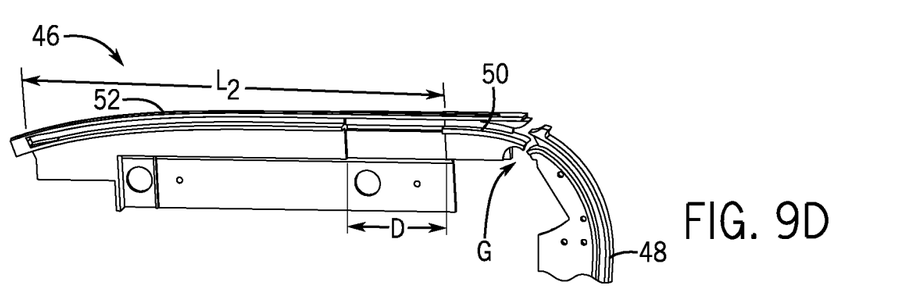
FIG. 9D is a schematic partial side view of the track assembly in the extended and lowered position according to an exemplary embodiment.
Figure 9E:
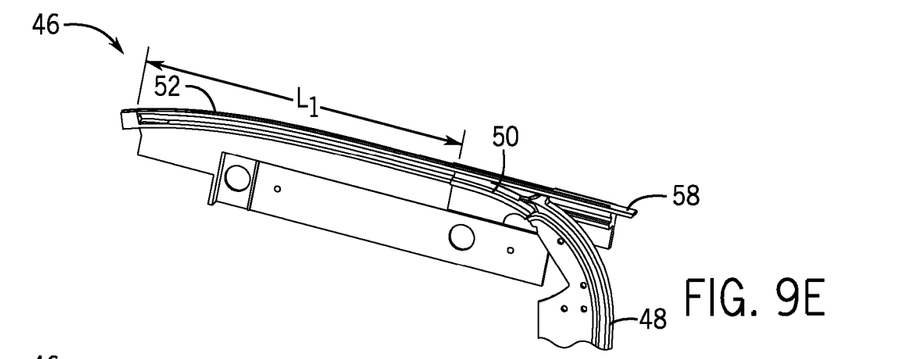
FIG. 9E is a schematic partial side view of the track assembly in the retracted and raised position according to an exemplary embodiment.
Figure 9F:
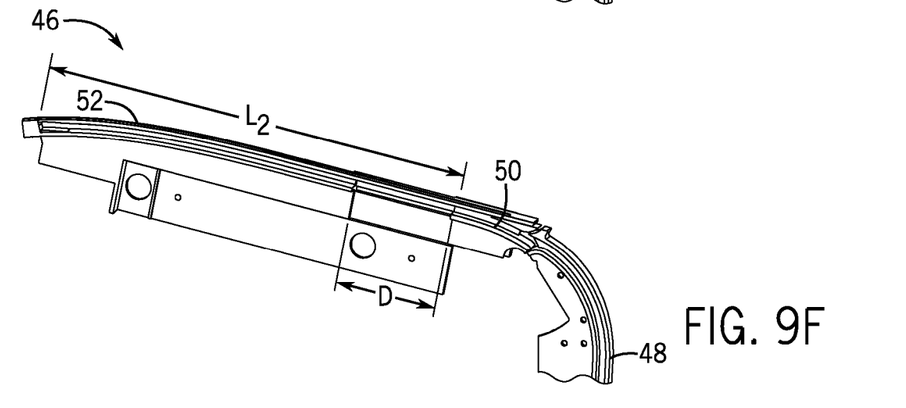
FIG. 9F is a schematic partial side view of the track assembly in the extended and raised position according to an exemplary embodiment.

As shown in FIGS. 9C and 9E, L1 indicates the distance between the front end of the third track 52 and the front end of the second track 50 when the track assembly is in the retracted position. As shown in FIGS. 9D and 9F, the armrest is at the extended position. L2 indicates the distance between the front end of the third track 52 and the front end of the second track 50 when the track assembly is in the extended position. The distance D represents the range of motion of the third track 52 (e.g. the difference between L1 and L2). Referring to FIGS. 9C and 9D, the first track 48 and the second track 50 are separated by a gap G while the armrest 22 is in the lowered position to facilitate rotation of the structure 32 relative to the floor console FC according to an exemplary embodiment. The first track 48 and the second track 50 are substantially aligned to facilitate movement of the tambour door along the tracks. As shown in FIGS. 9E and 9F, the gap G decreases as the armrest rotate toward the raised position. The second track 50 remains aligned with the first track 48 regardless of the vertical position of the armrest.

According to an exemplary embodiment, the adjustable armrest assembly may be employed within a floor console or other vehicle interior components, for example, a seat, a door panel, and/or a rear seat assembly. According to an exemplary embodiment, an adjustable armrest assembly may provide an armrest configured to be raised/lowered and/or adjusted fore/aft to a position that facilitates driver and/or passenger comfort; the armrest assembly may also include a tambour door slidingly coupled to the armrest configured to slide between an open position with access to a storage compartment and a closed position for the storage compartment.

According to an exemplary embodiment a vehicle armrest assembly may comprise a support structure; and a structure may be pivotally coupled to the support structure; an armrest slidingly supported by the structure; the armrest may be configured to slide between a retracted position and an extended position. The structure may facilitate rotation of the armrest between a raised position and a lowered position relative to the support structure.

A tambour door on the armrest may be configured to slide between an opened position and a closed position relative to the armrest; the tambour door may be used while the armrest is in or between the retracted position and the extended position and while the armrest is in or between the raised position and the lowered position.

The support structure may comprise a vehicle console. The vehicle console may comprise a storage compartment accessible while the tambour door is in the open position. A rail assembly may be coupled to the structure and to the armrest; the rail assembly may be configured to enable the armrest to slide relative to the structure. A shroud may be attached to the structure. The shroud may be at least partially disposed within the support structure. An adjustment mechanism may be configured to hold the armrest in one of a plurality of vertical positions including the lowered position and the raised position. The structure and the shroud may be pivotally coupled to the support structure by a pivot joint; the pivot joint is positioned at a first longitudinal end of the vehicle armrest assembly. The adjustment mechanism may be positioned at a second longitudinal end of the vehicle armrest assembly, opposite the first longitudinal end.

According to an exemplary embodiment the vehicle armrest assembly may comprise a support structure having a first track; an armrest slidingly supported by the structure and having a third track, wherein the armrest is configured to slide between a retracted position and an extended position relative to the structure, and the structure facilitates rotation of the armrest between a raised position and a lowered position relative to the support structure; and a tambour door slidingly supported by the first track, second track, and third track; the first track, second track, and third track are aligned to enable the tambour door to slide between an opened position and a closed position relative to the armrest while the armrest is in or between the retracted position and the extended position and while the armrest is in or between the raised position and the lowered position. An armrest/cover assembly structure is pivotally coupled to the support structure (e.g. having a second track). The second track and third track interface with one another to establish a substantially continuous path between a first end of the second track and a second end of the third track while the armrest is in or between the retracted position and the extended position. The first track and the second track are separated from one another by a gap while the armrest is in the lowered position to facilitate rotation of the shroud relative to the support structure.

The support structure comprises a storage compartment accessible while the tambour door is in the open position. A rail assembly may be coupled to the structure and to the armrest; the rail assembly is configured to enable the armrest to slide relative to the structure. The structure may have a shroud attached to the structure. The shroud is at least partially disposed within a recess of the support structure. An adjustment mechanism may be configured to hold the armrest in one of a plurality of vertical positions including the lowered position and the raised position; the structure may be pivotally coupled to the support structure by a pivot joint; the pivot joint may be positioned at a first longitudinal end of the vehicle armrest assembly, and the adjustment mechanism may be positioned at a second longitudinal end of the vehicle armrest assembly opposite the first longitudinal end.

A vehicle armrest assembly may comprise a support structure and an armrest slidingly supported by the structure. The armrest may be configured to slide between a retracted position and an extended position. A track assembly may extend along the support structure and the armrest. A tambour door may be supported by the track assembly. The track assembly is configured to enable the tambour door to slide between an opened position and a closed position relative to the armrest while the armrest is in or between the retracted position and the extended position; and while the armrest is in or between the raised position and the lowered position.

A structure may be pivotally coupled to the support structure. The track assembly may comprise an expandable portion configured to enable the armrest to slide relative to the structure and to establish a substantially continuous path along the expandable portion while the armrest is in or between the retracted position and the extended position. The track assembly may comprise a rotatable portion configured to facilitate rotation of the structure relative to the support structure. The rotatable portion may be separated from a fixed portion of the track assembly by a gap while the armrest is in the lowered position. A rail assembly (or track system) may be coupled to the structure and to the armrest; the rail assembly may be configured to enable the armrest to slide relative to the structure. An adjustment mechanism may be configured to hold the armrest in a plurality of positions including the lowered position and the raised position.

According to an exemplary embodiment, a console comprises a support structure comprising a storage volume and an armrest comprising a tambour door and configured for adjustment from a first position to a second position. See FIGS. 3-4 and 6A-6D. The tambour door of the armrest is configured for movement from a closed position to cover the storage volume to an open position to uncover the storage volume. The first position of the armrest provides a lowered position and the second position of the armrest provides a raised position; the armrest provides a first height in the first position and a second height in the second position different than the first height. The first position of the armrest comprises a retracted position and the second position of the armrest comprises an extended position; the armrest comprises a first length in the first position and a second length in the second position different than the first length. A track system may be configured to allow the tambour door to adjust from the closed position to the open position while the armrest is in the first position and the second position.

According to an exemplary embodiment, a vehicle interior component comprises a base and an armrest assembly providing a cover. See FIGS. 3-4 and 6A-6D. The armrest assembly is configured for movement between a raised position and a lowered position relative to the base. The cover of the armrest assembly is configured to move from a closed position to an open position while the armrest assembly is in the raised position and in the lowered position. The base provides a storage compartment and the cover of the armrest assembly may be configured to cover and uncover the storage compartment. The armrest assembly provides a storage compartment and the cover of the armrest assembly may be configured to cover and uncover the storage compartment. The armrest assembly may be configured for movement between an extended position and a retracted position relative to the base when the armrest assembly is in the raised position and the lowered position. The cover of the armrest assembly may be configured to move from the closed position to the open position while the armrest assembly is in the extended position and the retracted position. A track system may be configured for the cover to move from the closed position to the open position (a) while the armrest assembly is in the raised position and the lowered position and (b) while the armrest assembly is in the extended position and retracted position. The track system comprises a first track attached to the base and a second track aligned at an interface with the first track; the cover may be configured to travel on the track system along the first track and across the interface to the second track.

According to an exemplary embodiment, a console assembly comprises a base and a cover assembly for the base comprising a housing and providing a cover. See FIGS. 3-4 and 6A-6D. The cover may be configured for movement relative to the base and relative to the cover assembly. The cover assembly may be configured for movement between a raised position and a lowered position. The cover may be configured for movement relative to the base and relative to the cover assembly in both the raised position and the lowered position. The base comprises a support structure; the cover may comprise a tambour door; and the cover assembly may comprise an armrest. A track system may comprise (1) a first track attached to the base to provide for movement of the cover into the base and for movement of the cover relative to the housing; (2) a second track providing for movement of the cover relative to the housing and the base and for movement of the cover assembly relative to the base; and the cover assembly may be configured to pivot relative to the base from a lowered position to a raised position. A third track may provide for movement of the cover relative to the housing and the cover relative to the base and for movement of the cover assembly relative to the base; the third track facilitates translation of the cover assembly from the retracted position to the extended position. The track system facilitates sliding movement of the cover through the intermediate position of the cover assembly. The cover assembly may be configured to translate relative to the base from a retracted position to an extended position; the cover may be moveable on a track system; the track system may comprise a first track fixed to the base, a second track moveable relative to the base and a third track attached to the cover assembly. (The first track is substantially vertical and the second track is substantially horizontal when the cover assembly is in the lowered position.) A shroud for the base may be configured to be deployed to at least partially obstruct access to the first storage compartment when the armrest assembly is in the raised position; the shroud may be retracted into the base when the armrest assembly is in the lowered position.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is therefore to be understood that the appended claims are intended to cover all such modifications and changes as fall within the true spirit of the invention. In an effort to provide a concise description of the exemplary embodiments, all features of an actual implementation may not have been described (i.e., those unrelated to the presently contemplated best mode of carrying out the invention, or those unrelated to enabling the claimed invention). It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A console for a vehicle interior comprising:
   a support structure comprising a storage volume; and
   an armrest comprising a tambour door and configured for adjustment from a first position to a second position;
   wherein the tambour door of the armrest is configured for movement from a closed position to cover the storage volume to an open position to uncover the storage volume;
   wherein the first position of the armrest comprises a retracted position and the second position of the armrest comprises an extended position; wherein the armrest comprises a first length in the first position and a second length in the second position different than the first length.

2. The console of claim 1 wherein the armrest comprises a lowered position and the armrest comprises a raised position; wherein the armrest provides a first height in the lowered position and a second height in the raised position different than the first height.

3. The console of claim 1 further comprising a track system configured to allow the tambour door to adjust from the closed position to the open position while the armrest is in the first position and the second position.

4. A vehicle interior component comprising:
   a base; and
   an armrest assembly providing a cover;
   wherein the armrest assembly is configured for movement between a raised position and a lowered position relative to the base;
   wherein the cover of the armrest is configured to move from a closed position to an open position while the armrest assembly is in the raised position and in the lowered position;
   wherein the armrest assembly is configured for movement between an extended position and a retracted position relative to the base when the armrest assembly is in the raised position and the lowered position.

5. The vehicle interior component of claim 4 wherein the base provides a storage compartment and wherein the cover of the armrest assembly is configured to cover and uncover the storage compartment.

6. The vehicle interior component of claim 4 wherein the armrest assembly provides a storage compartment and wherein the cover of the armrest assembly is configured to cover and uncover the storage compartment.

7. The vehicle interior component of claim 5 wherein the cover of the armrest assembly is configured to move from the closed position to the open position while the armrest assembly is in the extended position and the retracted position.

8. The vehicle interior component of claim 5 further comprising a track system configured for the cover to move from the closed position to the open position (a) while the armrest assembly is in the raised position and the lowered position and (b) while the armrest assembly is in the extended position and retracted position.

9. The vehicle interior component of claim 8 wherein the track system comprises a first track attached to the base and a second track aligned at an interface with the first track; wherein the cover is configured to travel on the track system along the first track and across the interface to the second track.

10. The vehicle interior component of claim 4 wherein the cover of the armrest assembly comprises a tambour door and the base comprises a console.

11. A console assembly for a vehicle interior comprising: a base; a cover assembly for the base comprising a housing and providing a cover; wherein the cover is configured for movement relative to the base and relative to the housing; wherein the cover assembly is configured for movement (a) between a raised position and a lowered position through an intermediate position and (b) between a retracted position and an extended position; wherein the cover is configured for movement relative to the base and the housing in both the raised position and the lowered position.

12. The console assembly of claim 11 wherein the base comprises a support structure; wherein the cover comprises a tambour door; and wherein the cover assembly comprises an armrest.

13. The console assembly of claim 11 comprises a track system comprising (1) a first track attached to the base to provide for movement of the cover into the base and for movement of the cover relative to the cover assembly; (2) a second track providing for movement of the cover relative to the housing and the base and for movement of the cover assembly relative to the base; and wherein the cover assembly is configured to pivot relative to the base from a lowered position to a raised position.

14. The console assembly of claim 13 comprising a third track providing for movement of the cover relative to the housing and the cover relative to the base and for movement of the cover assembly relative to the base; wherein the third track facilitates translation of the cover assembly from the retracted position to the extended position.

15. The console assembly of claim 13 wherein the track system facilitates sliding movement of the cover through the intermediate position of the cover assembly.

16. The console assembly of claim 13 wherein the cover assembly is configured to translate relative to the base from a retracted position to an extended position; wherein the cover is moveable on a track system between a closed position and an open position through an intermediate position; wherein the track system comprises a first track fixed to the base; a second track moveable relative to the base; and a third track attached to the cover assembly.

17. The console assembly of claim 13 wherein the first track is substantially vertical and the second track is substantially horizontal when the cover assembly is in the lowered position.

18. The console assembly of claim 11 further comprising a shroud for the base configured to be deployed to at least partially obstruct access to the first storage compartment when the armrest assembly is in the raised position.

* * * * *

UNITED STATES PATENT AND TRADEMARK OFFICE
CERTIFICATE OF CORRECTION

PATENT NO. : 9,713,972 B2
APPLICATION NO. : 15/063225
DATED : July 25, 2017
INVENTOR(S) : Bozio et al.

Page 1 of 1

It is certified that error appears in the above-identified patent and that said Letters Patent is hereby corrected as shown below:

In the Claims

Column 12, Line 51; Claim 7, Change "The vehicle interior component of claim 5" to -- The vehicle interior component of claim 4 --

Column 12, Line 56; Claim 8, Change "The vehicle interior component of claim 5" to -- The vehicle interior component of claim 4 --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*